J. C. LOTTERHAND.

PRINTING MECHANISM FOR ADDING MACHINES.

APPLICATION FILED JAN. 13, 1913.

Reissued Mar. 4, 1913. 13,539.

2 SHEETS—SHEET 1.

*Witnesses;*

*Louis C. Badeau.*

*H. D. Penney*

*Inventor,*

*Jason C. Lotterhand.*

*By his Attorney,*

*F. A. Richards.*

J. C. LOTTERHAND.
PRINTING MECHANISM FOR ADDING MACHINES.
APPLICATION FILED JAN. 13, 1913.
Reissued Mar. 4, 1913. 13,539.
2 SHEETS—SHEET 2.
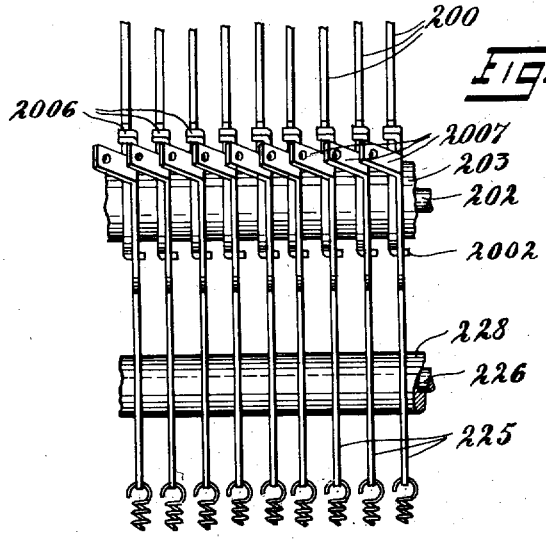
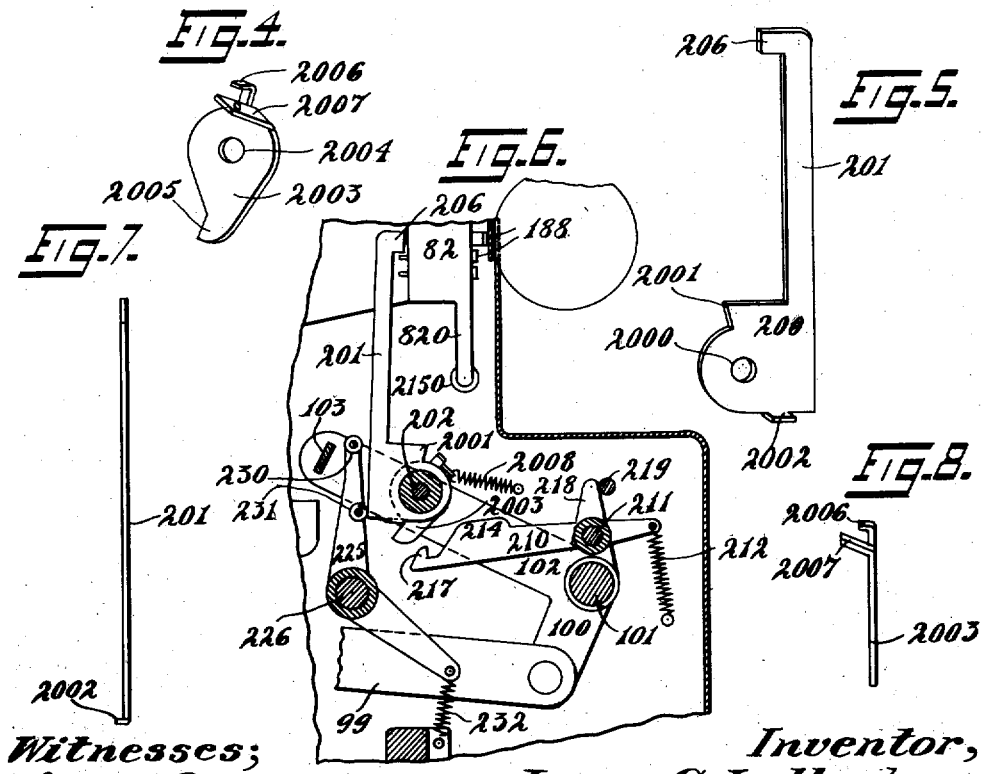
Witnesses;
Louis C. Badeau.
H. D. Penney
Inventor,
Jason C. Lotterhand.
By his Attorney, F. H. Richards.

UNITED STATES PATENT OFFICE.

JASON C. LOTTERHAND, OF NEW YORK, N. Y., ASSIGNOR TO ADDOMETER CORPORATION, OF DOVER, DELAWARE, A CORPORATION OF DELAWARE.

PRINTING MECHANISM FOR ADDING-MACHINES.

13,539. Specification of Reissued Letters Patent. Reissued Mar. 4, 1913.

Original No. 985,042, dated February 21, 1911, Serial No. 484,665. Application for reissue filed January 13, 1913. Serial No. 741,884.

*To all whom it may concern:*

Be it known that I, JASON C. LOTTERHAND, a citizen of the United States, residing in New York city, county and State of New York, have invented certain new and useful Improvements in Printing Mechanism for Adding-Machines, of which the following is a specification.

This invention relates to an improved form of striking mechanism or hammer device for calculating machines or other form of printing mechanism, wherein a blow is given to a type member.

One object of the invention is to provide means for causing the actuation of any intermediate hammer or actuator, to effect the operation of all of the hammers of lower order that may not have been set to print a digit, and cause such members to print the naughts; while none of the hammers to the left will be caused to operate; and which construction will, at the same time, permit the hammers to over-carry a slight distance beyond the normal position, and then rebound or return to their normal position.

Another object of the invention is to provide an improved construction of hammer and its operating member or energizer, wherein the hammer will be pressed forward when retracted to return the hammer to its normal position by a quick blow and cause it to carry slightly beyond the normal position to print, and immediately rebound to return to normal position.

Figure 1:
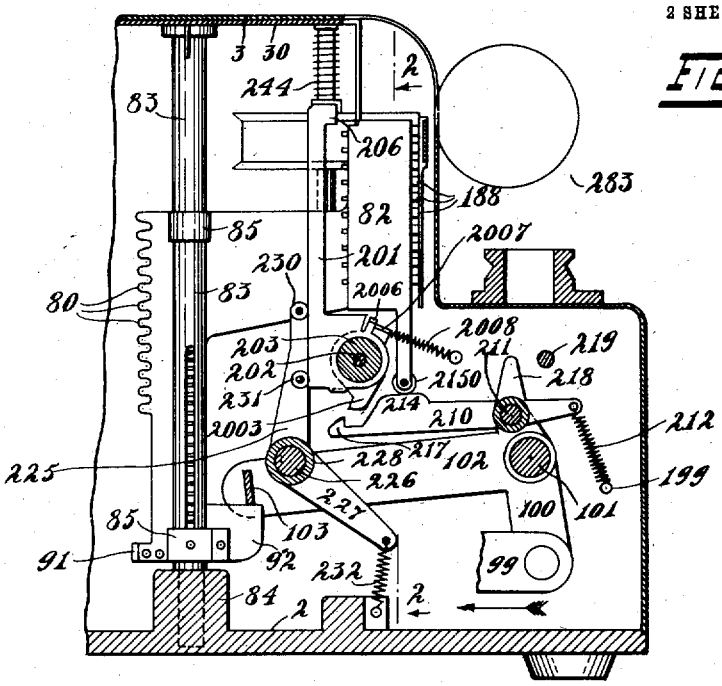
Figure 3:
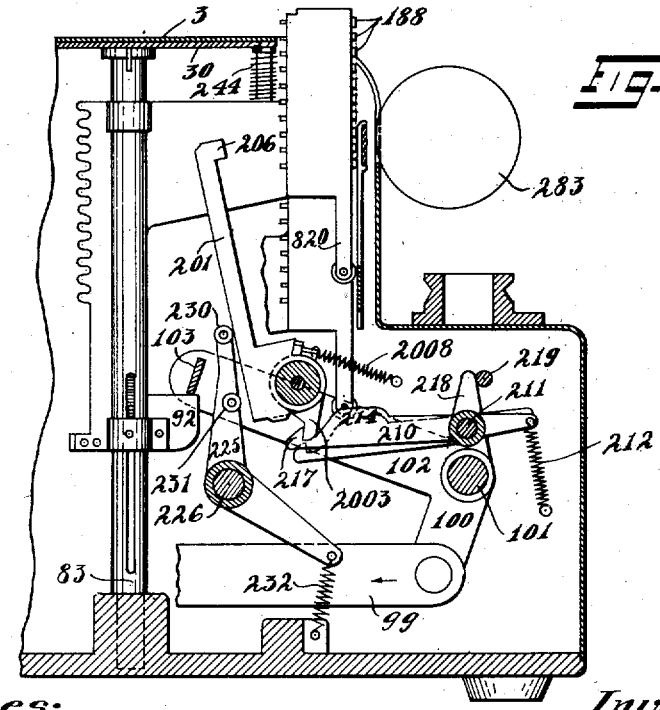

In the accompanying drawings, showing one embodiment of my invention, Figure 1 is a vertical section and partial side elevation of one portion of an adding machine. Fig. 2 is a rear elevation of the type actuators and their energizers. Fig. 3 is a view similar to Fig. 1 showing one actuator drawn back by its trigger. Fig. 4 is a perspective view of one catch plate. Fig. 5 is a perspective view of one type actuator. Fig. 6 is a view of most of the parts shown in Fig. 1 with an actuator in the striking position. Fig. 7 is an edge elevation of one actuator, and Fig. 8 is an edge elevation of one of the catch plates.

In Figs. 1 and 2 are set forth parts of an adding machine or calculator relating to the printing device, without disclosing the key mechanism by which the items are set up, that are to be printed, nor the adding devices connected therwith. It is common in this art to provide what is termed a rack and type plate, and the plates 81 are shown each provided at its front edge with a rack 80, and having a rear extension or wing 82 in which is mounted the type plungers 188 to be reciprocated when struck by a hammer, to effect an impression on the paper that may be carried by a suitable platen indicated generally by 283. Suitable springs (not shown) return the type when advanced.

The rack and type plate 81 is shown provided with guides 85 at its upper and lower portions, by which it is guided to reciprocate on a post 83 that is suitably supported in a socket 84 in the base 2 of the machine, and also supported at the upper member 3 of the machine. The post 83 is tubular and contains a spring 86 that connects between the post and the rack and type plate to draw the latter upward the full limit of movement. The plate 81 is normally held down by a universal bar 103, extending transversely across the series of rack and type plates to engage a rearward projection 92 on each plate. It is to be understood that there are a series of these rack and type plates 81 extending across the machine, such as nine, and that most of the parts are duplicated for each of these plates. The universal bar 103 is secured at each end to a lever 102 that swings on a cross shaft 101.

An arm 100 on the lever 102 is pivotally connected with a suitable actuating member, such as a bar 99, that is reciprocated from the main operating member of the machine at the proper period. This will swing the universal bar to move downward and return all of the rack and type plates, normally in the position indicated in Fig. 1, thereby tensioning the springs in the posts connected with the plates. When the universal bar is raised by said means, it will permit the rack and type plates to be drawn upward by these springs. At the front of each rack and type plate is a projection 91, that as this plate rises will engage with any one of a series of stops (not shown) that may have been advanced by a key or other device. Such construction is well known in this art, wherein any one of a set of nine digit keys is advanced and thereupon a rack plate is caused to advance to engage the key connection and be positioned appropriately. Therefore the rising of the universal bar will permit the rack and type plates to advance until they engage any set key connection. It will be understood that this advance of the rack and type plate will bring one of the type 188 opposite a printing plate on the platen, to be engaged by a hammer movable in a fixed path to effect the impression. But it is to be understood that this arrangement of the rack and type plate and universal bar, together with the stops, form no part of the present invention.

On a suitable cross shaft 202 are mounted a set of actuators or hammers, 200, in position to swing thereon and have their striker end 206 hit one of the plungers 208, that will be opposite the same as positioned by the shifting of the rack plate, and cause the same to effect an impression on the platen. The actuator 200 swings at its bore 2000 on the said shaft, and is provided with a shoulder 2001, and also with an ear 2002.

The actuators 200 are spaced apart a short distance on the shaft, and coöperating with each actuator or hammer is a catch plate 2003, having an aperture 2004 on which it turns freely on the shaft; and is also provided with an extension forming a catch tip 2005 projecting downward. Actuating means is provided between each catch plate and its operating hammer 200, thereby these two members have a slight limited movement on the shaft relative to each other, but beyond such movement they are connected to cause simultaneous movement. The catch plate has a flange or lug 2006 projecting toward the coöperating hammer to engage the shoulder 2001 thereon. And each hammer 200 has the ear or lug 2002 projecting to engage the adjacent catch plate 2003, as indicated in Figs. 1, 3 and 6. This ear and flange is so positioned as to permit a slight limited movement on the shaft of the catch plate relative to its coöperating hammer, and thereupon to cause said members to swing together.

The catch plates each are provided with an arm 2007 projecting toward the catch plate of next lower order, and which engages the flange 2006 on the said catch plate. By this means when any catch plate is swung, the coöperating ears on the catch plate and hammer will cause the hammer to be swung; at the same time the arm 2007 will engage the catch plate of next lower order to swing it and thereby its operating hammer. If, for example, the numeral 1 were set up to print 1000, then the three catch plates and hammers to the right would be operated, and the three zeros would be printed. A spring 2008 is shown connecting with each catch plate 2003 tending to return it when swung, but the device is also operative without this spring.

A set of triggers 210 are provided one for each catch plate, that are pivotally mounted on a cross shaft 211, carried on an extension of the levers 102, whereby the shaft carrying these triggers, and hence the triggers, are bodily moved when the lever 102 is swung to shift the universal bar. A spring 212 fast on a cross rod 199, connects with each trigger to swing the trigger and cause the hooked end 217 thereof to move upwardly, and engage the tip 2005 of the appropriate catch plate. When the trigger thus engages its coöperating catch plate, and the trigger is moved rearward by the lever 102, as indicated in Fig. 3, the catch plate will be swung and will retract the coöperating arm 201 of the appropriate actuator or hammer. At the end of this movement of the trigger an arm 218 on each trigger is brought to engage a bar 219, that will cause the trigger to swing on its shaft 211 against the force of the spring 212, moving the hook 217 downward to release the tip of the catch plate. By this arrangement the triggers would normally engage all of the catch plates to swing the hammers each time the lever 102 swings to raise the universal bar. Therefore means are provided for preventing the trigger engaging the catch plate where any rack and type plate has not been shifted from normal position by the setting of a stop.

The wing 82 of each type carrier is provided with an extension 820 that is shown as having a roller 2150 on the lower end that engages a portion 214 of each trigger, whereby in the normal position of the roller and extension, the trigger will be depressed against the force of its spring 212, and when the trigger is moved rearwardly by the swinging of the lever 102, its hook will be held free of the catch plate and therefore the catch plate will not be swung. But as soon as the rack and type plate rises to print any of the numerals, the roller 2150 will move away from the trigger permitting it to be drawn upward by its spring 212 to hook on the catch plate when the trigger moves rearward.

In some adding machines the type plate moves upward a very slight distance every time the universal bar rises to bring the "0" type opposite the hammer, and it is to be understood that this slight elevation of the type plate 81 will not permit the trigger to rise sufficiently to engage its hook with the catch plate, but the trigger will travel free therefrom when moved rearward.

To return the hammers or actuators 201 to strike a blow when retracted by the triggers, an energizer lever 225 is provided at the rear of each of the hammers, all of which swing on a shaft 226. These energizers are in the form of an elbow lever whose lower arm 227 connects with a spring 232 to swing the levers to always engage the rear of the hammers.

Each energizer lever 226 is provided with two places of engagement or contact with the hammer 201, preferably at its rear edge, which places are respectively on opposite sides of the axis of the hammer 200, whereby these contacts will tend to swing the lever in opposite directions when they are independently operative on the hammer; but when both of the contacts engage the hammer they tend to maintain the hammer in its normal position. As shown the energizer 225 has a roller 230 at its upper end engaging the rear edge of the hammer arm 201 above its axis, that will be pressed against the hammer by the spring 232 and when the hammer is retracted by the trigger, as indicated in Fig. 3, and thereupon released, the hammer will be swung back to its normal position by the energizer causing the striker 206 to engage one of the types 188 according to the position of the rack and type plate.

A second roller 231 is provided on the lever 225 to engage the rear edge of the hammer arm 201 below its axis, and the tendency of this roller, that is pressed against the lever by the spring 232, is to swing the hammer back away from the type, as indicated in Fig. 6. When the hammer is swung from the position of Fig. 3 in which the end roller only engages the hammer, it will return to normal position, and by its momentum will move still farther, during which extra movement it will strike the type and cause an impression. But in this position, as will be understood from Fig. 6, the roller 231 acting on the lower portion of the hammer will retract the hammer until it again engages with the roller 230, and hence the hammer will be normally retained in engagement with both of these rollers, as indicated in Fig. 1.

In the operation of the device, certain stops will be set by the keys, and thereupon the actuating member is put in movement to swing the lever 102 and raise the universal bar. The rack and type plates are set in different positions, and some rack and type plates where none of the keys in such certain banks are depressed, will be held down in the normal position or at least retained in the zero position. The rack and type plates that have been elevated will cause their arms 820 to release the coöperating triggers, permitting them to rise and engage the corresponding catch plates at the beginning of the movement of the lever 102; while the other rack and type plates that do not rise will retain the triggers depressed so that when the triggers are moved rearward they cannot engage the catch plate to swing the hammers. As the triggers move rearward, those that were permitted to engage the catch plates will swing the catch plates back against the force of the energizer levers to the position indicated in Fig. 3; thereupon the arms 218 engage the bar 219 to trip the triggers, and the hammers 201 will return to strike the type members 188, causing them to print.

Where there are one or more intermediate rack and type plates positioned to print, and the corresponding hammer is actuated, while the plates to the left are still at 0, and consequently the triggers will not engage to swing the hammers; in such case the arm 2007 on the said intermediate catch plate that has been swung by the trigger will engage its next catch plate to the right causing the latter catch plate to be swung the same as if engaged by its trigger, and the latter catch plate by its arm engage its adjacent catch plate to the right, and in this manner all catch plates to the right will be engaged and swung to retract each hammer against the force of its energizer lever, and cause the 0 to be printed by each hammer to the right; unless the type plate had been advanced to bring some figure opposite the hammer and the trigger raised. But the catch plate to the left of the highest intermediate catch plate that is tripped, has its projecting ear back of the catch plate to the right, and therefore none of the catch plates to the left will be engaged and no zeros will be printed to the left of the highest rack and type plate raised.

By reason of the slight play or limited movement between each catch plate and its hammer, when the catch plates are retracted by the triggers, they will take up this slight movement first and then retract the hammers. As the catch plates are released from the triggers the hammers are swung back by their energizers, and the catch plates are returned to normal position. During the latter movement the catch plates that have been moved will be brought to re-engage the catch plates to the left that were not moved by the engagement of the projecting arm. If the catch plates were fast to the hammers, when they return to this normal position, either the hammers could not advance for the extra movement because they would be impeded by engaging the catch plates of higher order, or else all of these catch plates of higher order would be shifted and cause the printing movement of the corresponding hammers. But at this stage the slight free movement between each hammer and its actuator is brought into use and the hammer goes forward the amount of this movement independent of the catch plate, and hence will advance to produce the advance of the type to print, and thereupon return to normal position by the operation of the two rollers of the energizer lever. It will also be understood that as any intermediate catch plate is retracted, its arm will engage the catch plate to the left and so on in succession, whereby the catch plates will be simultaneously retracted just as if they were all engaged by their triggers. The catch plates thus retracted will, after the lost motion has been taken up, simultaneously retract all of the hammers corresponding therewith, and when the trigger or triggers release the catch plates, the other catch plates coöperating therewith by reason of the arm, will be simultaneously released, and the hammers will thereby be simultaneously returned by their energizers. Heretofore, each hammer or actuator was provided with an arm arranged to engage the hammer or actuator to the left; and, as just explained, a certain amount of free movement had to be provided so that the hammers would not be simultaneously retracted but move in succession. This small amount of play, when extended from one side to the other for nine keys, resulted in the last hammer to the right being retracted comparatively short distance, and the blow would therefore be very weak or ineffective. With the present construction the free limited movement is not between the series of catch plates, but between each catch plate and its coöperating hammer, while the arms on the catch plates are so arranged that they will cause the simultaneous retraction of all the catch plates to the right of an intermediate one that is retracted by its trigger.

Having thus described my invention, I claim:

1. In a machine of the character described, comprising printing actuators and their energizers, each actuator being provided with an arm extending toward the actuator of next higher order, means for simultaneously moving all of the actuators, comprising a separable catch plate provided with a flange adapted to engage the rear edge of the actuator.

2. In a device of the character described, the combination with a shaft and a type actuator loosely mounted thereon, of a coöperating catch plate loosely mounted on the same shaft and means for limiting its movement with respect to the actuator, consisting of a flange on the actuator adapted to be engaged by the edge of the catch plate, and a flange on the catch plate adapted to be engaged by the edge of the actuator.

3. In a device of the character described, a shaft, a denominational series of type actuators loosely mounted thereon, and a series of coöperating catch plates, one for each actuator, each catch plate having a tip adapted to be engaged by a trigger, and an arm extending into the plane of the plate of the next lower order.

4. In a device of the character described, a shaft, a denominational series of type actuators loosely mounted thereon, and a series of coöperating catch plates, one for each actuator, each catch plate having a tip to be engaged by a trigger and an arm extending into the plane of the plate of the next lower order, in combination with means adapted to cause each catch plate to engage its actuator after a limited movement in a vertical plane.

5. In a device of the character described, a shaft, a denominational series of type actuators loosely mounted thereon, and a series of coöperating catch plates, one for each actuator, each catch plate having a tip adapted to be engaged by a trigger, and an arm extending into the plane of the plate of the next lower order, in combination with means adapted to cause each catch plate to engage its actuator after a limited movement in a vertical plane, comprising a flange on the catch plate adapted to contact with the actuator after such movement.

6. A printing mechanism for an adding machine comprising a type hammer energizer consisting of an elbow lever provided with a plurality of rollers arranged along its upper arm.

7. In a device of the character described, a type hammer, means for tilting it backward, comprising a catch plate, and a pivoted spring pressed elbow lever normally in contact with the rear edge of the hammer whereby the elbow lever is oscillated as the hammer is tilted.

8. In a device of the kind described, a shaft, and a trigger loosely mounted thereon and provided with a hook, and a stop arm, a retracting spring for the trigger in combination with a type carrier provided with a roller adapted to be engaged by the trigger.

9. In a device of the kind described, a shaft, a trigger loosely mounted thereon, comprising a forward hook, and an upwardly projecting stop arm, a rearwardly projecting arm, and a spring connecting the last named arm with a permanent part of the machine, in combination with a vertically movable type carrier provided with a downwardly projecting arm, and a roller carried by said arm and adapted to engage the trigger.

10. In a device of the character described, a type hammer loosely mounted on a shaft, in combination with an actuator consisting of an elbow lever, and a plurality of rollers adapted to contact with the hammer and arranged between it and the fulcrum of the elbow lever.

11. In a device of the kind described, a type hammer, an actuator therefor provided with a pivot on which the actuator is adapted to be moved as the hammer is moved, and a plurality of rollers intermediate the pivot and the hammer and adapted to contact with the latter.

12. In a device of the kind described, a type hammer, means for moving it in one direction, an elbow lever fulcrumed beneath the hammer and provided with means for moving it in the opposite direction, and two rollers on the lever which are both in contact with the rear of the hammer only when the latter is in a normal position.

13. In a printing device, a shaft, a set of actuators loose on the shaft, a set of catch plates loose on the shaft one catch plate being connected with each actuator to operate it but allowing limited relative movement on the shaft, a trigger coöperating with each catch plate, and an arm on each catch plate arranged to engage the catch plate of next lower order to swing the same whereby the swinging of any catch plate by its trigger will swing all catch plates of lower order to operate the actuators connected therewith.

14. In a printing device, a shaft, a set of actuators loose on the shaft, a set of catch plates loose on the shaft one catch plate being connected with each actuator to operate it but allowing limited relative movement on the shaft, and an arm on each catch plate arranged to engage the catch plate of next lower order to swing the same whereby the swinging of any catch plate will swing all catch plates of lower order to operate the actuators connected therewith.

15. In a printing device, a shaft, a set of actuators loose on the shaft, a set of catch plates loose on the shaft one adjacent each actuator, a lug on each catch plate arranged to engage the adjacent actuator and lug on each actuator arranged to engage each adjacent catch plate, said lugs causing the catch plate to operate the actuator but permitting limited relative movement on the shaft, and an arm on each catch plate arranged to engage the catch plate of next lower order, whereby the swinging of any catch plate will swing all catch plates of lower order to operate the actuators connected therewith.

16. In a printing device, a shaft, a set of actuators loose on the shaft, a set of catch plates loose on the shaft one catch plate being connected with each actuator to operate it but allowing limited relative movement on the shaft, a tip on each catch plate, a trigger having a lug coöperating with each catch plate tip, and an arm on each catch plate arranged to engage the catch plate of next lower order to swing the same whereby the swinging of any catch plate by its trigger will swing all catch plates of lower order to operate the actuators connected therewith.

17. In a printing device, a shaft, a set of actuators loose on the shaft, a set of catch plates loose on the shaft one catch plate being connected with each actuator to operate it but allowing limited relative movement on the shaft, and an arm on each catch plate arranged to engage the catch plate of next lower order to swing the same whereby the swinging of any catch plate will swing all catch plates of lower order to operate the actuators connected therewith, an energizer arranged to engage each actuator to advance it when the actuator has been swung by its catch plate, each actuator and its energizer having a loose connection permitting additional movement of the actuator beyond its normal position when advanced, by reason of said limited relative movement between the actuator and its catch plate.

18. In a printing device, a shaft, a set of actuators loose on the shaft, a set of catch plates loose on the shaft one catch plate being connected with each actuator to operate it but allowing limited relative movement on the shaft, and an arm on each catch plate arranged to engage the catch plate of next lower order to swing the same whereby the swinging of any catch plate will swing all catch plates of lower order to operate the actuators connected therewith, an energizer arranged to engage each actuator to advance it when the actuator has been swung by its catch plate, each actuator and its energizer having a resilient connection permitting additional movement of the actuator beyond its normal position when advanced, by reason of said limited relative movement between the actuator and its catch plate.

19. The combination of a pivoted actuator, means for retracting the actuator, and an energizer lever having two places of engagement with the actuator that are operative independently to swing the actuator in opposite directions respectively, and are jointly operative to maintain the actuator in normal position.

20. The combination of a pivoted actuator, means for retracting the actuator, and an energizer lever having two places of engagement with the actuator one on each side of the actuator axis, that are operative independently to swing the actuator in opposite directions respectively, and are jointly operative to maintain the actuaor in normal position.

21. The combination of a pivoted actuator, means for retracting the actuator, and an energizer lever having two places of engagement with the actuator that are operative independently to swing the actuator in opposite directions respectively, and are jointly operative to maintain the actuator in normal position, and a spring on the energizer lever pressing it against the actuator.

22. In a printing device, the combination of a set of type carriers shiftable to different positions, a set of actuator members one for each carrier, a trigger arranged to cooperate with each actuator member when the proper carrier is advanced from normal position, each type carrier in normal position being in engagement with coöperating trigger to hold the trigger away from position for engagement with the coöperating actuator member.

23. In a device of the character described, the combination with a shaft and means for oscillating the shaft in the operation of the machine, of an arm fast on the shaft, a trigger pivoted on the said arm to be bodily shifted when the shaft is swung, a spring connected with the trigger to swing it in one direction, an actuator member pivoted to swing and provided with an extension arranged to engage said trigger to be swung thereby when the trigger is advanced by its supporting arm, a type carrier shiftable to different positions and arranged in its normal position to engage the trigger and hold it during its said bodily movement in position whereby it will not engage the said extension of the actuator, an arm on the trigger, and a stop arranged to engage said arm upon the movement of the trigger by its supporting arm to swing the trigger against the force of its said spring and cause it to disengage the actuator.

24. In an adding machine, the combination with a shaft mounted to oscillate and means for oscillating the shaft in the operation of the machine, of an arm fast on the shaft, a trigger pivoted on the arm, a spring connected with the trigger, an actuator pivoted to swing, a catch plate pivotally mounted and connected with the actuator for limited movement relative thereto, said catch plate being arranged to coöperate with the trigger to cause the advance of the trigger by its supporting arm to swing the catch plate and actuator, a rack bar shiftable to different positions and having an arm arranged in the normal position of the type bar to engage the trigger to cause the trigger when advanced by its supporting arm to move free from the catch plate, an arm fast on the trigger, and a stop arranged to engage said arm when the trigger is advanced to swing it on its pivots to release the catch plate and actuator.

JASON C. LOTTERHAND.

Witnesses:
WILLIAM H. REID,
H. D. PENNEY.